(No Model.)
G. W. BRYAN.
TIRE FOR CARRIAGE WHEELS.
No. 502,808. Patented Aug. 8, 1893.
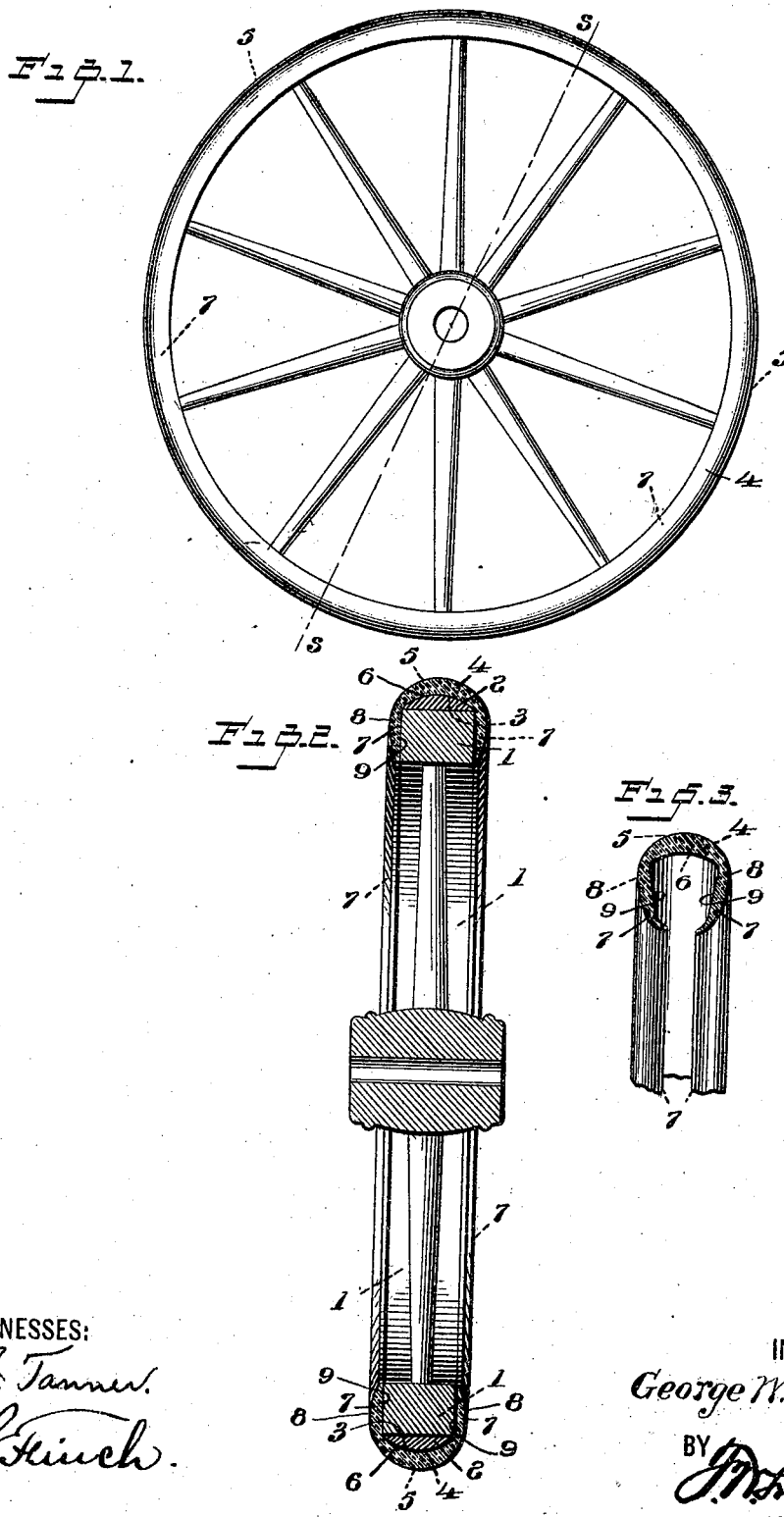
WITNESSES:
INVENTOR
George W. Bryan.
BY
ATTORNEY

UNITED STATES PATENT OFFICE.

GEORGE W. BRYAN, OF ROWAYTON, CONNECTICUT.

TIRE FOR CARRIAGE-WHEELS.

SPECIFICATION forming part of Letters Patent No. 502,808, dated August 8, 1893.

Application filed March 20, 1893. Serial No. 466,887. (No model.)

*To all whom it may concern:*

Be it known that I, GEORGE W. BRYAN, a citizen of the United States, residing at Rowayton, in the county of Fairfield and State of Connecticut, have invented certain new and useful Improvements in Tires for Carriage-Wheels; and I do hereby declare the following to be a full, clear, and exact description of the invention, such as will enable others skilled in the art to which it appertains to make and use the same.

My invention relates to certain new and useful improvements in rubber tires for carriage wheels, and has for its object to provide such a tire as may be removed from or applied to the wheel very readily, and which shall be so constructed that no fastening devices are necessary to hold the tire in place.

In the accompanying drawings—Figure 1, is an elevation of a wheel equipped with my improvement; Fig. 2, a section at line *s—s*, of Fig. 1, and Fig. 3, a detail broken cross-section of the rubber tire.

Similar numerals denote like parts in the several figures.

1 is the felly of the wheel; 2 an iron tire on said felly, said tire being half round on its outer surface as seen at 3.

The rubber tire is molded into shape, and comprises a "tread" part 4 which is convexly curved on the outside as seen at 5, and concavely curved on the inside as seen at 6, which latter conforms closely to the surface 3 of the tire 2.

7 are the side lips which in their normal position curve inward from the part 4 and approach each other, forming clamping lips, which, when in position on the wheel, embrace the sides of the felly in a straight line and are clamped thereto by reason of their resiliency. These lips are convexly curved on the outside as seen at 8 to present continuity with the curve 5, and are concavely curved on the inside as seen at 9 to insure close cling to the sides of the felly. Furthermore, said lips are tapered toward their free ends in order to more effectually prevent accidental displacement of the tire.

In applying my tire it is simply sprung around the tire 2, and felly, the rubber tire having an annular diameter less than that of the wheel in order that such tire by its resiliency may set firmly around the wheel.

When my tire is in position on the wheel the lips will be distended from their normal position, but, owing to their springy nature and to their outline and shape they will cling closely to the sides of the felly and will prevent the tire from becoming accidentally displaced.

By the use of my improvement a wheel may be equipped with a rubber tire in a few seconds, and such tire may be removed and replaced at pleasure.

My invention is especially advantageous as applied to the wheels of perambulators and invalid chairs, since the impact of the wheel is thereby rendered noiseless and great comfort and ease are contributed to the occupant of the vehicle.

I claim—

The combination with a wheel having a felly and a half round metal tire around the same, of a rubber tire of less annular diameter than said wheel, said rubber tire being convex on the outside and concave on the inside to conform to the metal tire and provided with inwardly curved clamping lips tapered toward their extremities and convex on the outside and concave on the inside, said lips embracing the sides of the felly in a straight line, and to be held thereon by frictional contact, substantially as shown and described.

In testimony whereof I affix my signature in presence of two witnesses.

GEORGE W. BRYAN.

Witnesses:
E. THOMES,
HARRY S. BRYAN.